US011080803B2

(12) United States Patent
Sittig et al.

(10) Patent No.: US 11,080,803 B2
(45) Date of Patent: Aug. 3, 2021

(54) SYSTEMS AND METHODS OF USING GEOLOCATION VERIFICATION

(71) Applicant: Relola, Inc., Mountain View, CA (US)

(72) Inventors: Heather Lynn Sittig, Oakland, CA (US); Kristen Emily Anne Policy, Berkeley, CA (US); Graham Alan Golder, Fremont, CA (US)

(73) Assignee: Relola Inc., Mountain View, CA (US)

( * ) Notice: Subject to any disclaimer, the term of this patent is extended or adjusted under 35 U.S.C. 154(b) by 0 days.

(21) Appl. No.: 16/676,432

(22) Filed: Nov. 6, 2019

(65) Prior Publication Data
US 2020/0118229 A1  Apr. 16, 2020

Related U.S. Application Data

(63) Continuation of application No. 15/178,538, filed on Jun. 9, 2016, now Pat. No. 10,529,040.
(Continued)

(51) Int. Cl.
*G06Q 50/16* (2012.01)
*H04W 4/21* (2018.01)
(Continued)

(52) U.S. Cl.
CPC ..... *G06Q 50/167* (2013.01); *G06F 16/24578* (2019.01); *H04L 51/12* (2013.01);
(Continued)

(58) Field of Classification Search
CPC . G06Q 50/167; H04W 4/21; G06F 16/24578; H04L 51/12
(Continued)

(56) References Cited

U.S. PATENT DOCUMENTS 6,684,196 B1   1/2004 Mini
9,014,666 B2 *  4/2015 Bentley ............... G06F 21/34
                                        455/411
(Continued)

FOREIGN PATENT DOCUMENTS

WO      2012000107       1/2012

OTHER PUBLICATIONS

Lee et al., "An Intelligent Approach to Review Filtering and Review Quality Improvement", doi: 10.1109/ACIT-CSII-BCD.2016.024, 2016, pp. 61-66. (Year: 2016).*
(Continued)

*Primary Examiner* — Peter C Shaw
(74) *Attorney, Agent, or Firm* — Ahmann Kloke LLP

(57) ABSTRACT

Systems and methods for displaying one or more submissions are described. One such exemplar method includes: (i) accepting, from a client device associated with a reviewer, a representation of the reviewer's presence at a represented location; (ii) receiving location coordinates of a location-enabled device when the reviewer represents being present at the represented location and the location-enabled device is proximate and/or in possession of the reviewer; (iii) deeming the reviewer as an authorized reviewer of the represented location if the location coordinates of the location-enabled device are within a predefined threshold area around the represented location when the reviewer represents being present at the represented location; and (v) causing to be displayed, on one or more of the client devices, one or more submissions relating to the represented location received from the authorized reviewer of the represented location.

20 Claims, 10 Drawing Sheets

Related U.S. Application Data

(60) Provisional application No. 62/173,347, filed on Jun. 9, 2015.

(51) Int. Cl.

| | |
|---|---|
| *G06F 16/2457* | (2019.01) |
| *H04W 12/08* | (2021.01) |
| *H04W 4/021* | (2018.01) |
| *H04L 29/06* | (2006.01) |
| *H04L 29/08* | (2006.01) |
| *H04L 12/58* | (2006.01) |
| *H04W 12/63* | (2021.01) |

(52) U.S. Cl.
CPC ............ *H04L 51/36* (2013.01); *H04L 63/107* (2013.01); *H04L 67/18* (2013.01); *H04W 4/021* (2013.01); *H04W 4/21* (2018.02); *H04W 12/08* (2013.01); *H04W 12/63* (2021.01)

(58) Field of Classification Search
USPC .......................................................... 726/4
See application file for complete search history.

(56) References Cited

U.S. PATENT DOCUMENTS

| | | | |
|---|---|---|---|
| 9,075,979 B1* | 7/2015 | Queru | G06F 21/34 |
| 2006/0241963 A1 | 10/2006 | Walker | |
| 2010/0063829 A1 | 3/2010 | Dupray | |
| 2010/0185552 A1* | 7/2010 | DeLuca | G06Q 30/02 705/347 |
| 2011/0196732 A1 | 8/2011 | Schueller | |
| 2014/0006486 A1 | 1/2014 | Bintliff | |
| 2014/0148190 A1 | 5/2014 | Lancaster | |
| 2014/0289261 A1 | 9/2014 | Shivakumar | |
| 2015/0025790 A1 | 1/2015 | Hwang | |
| 2015/0031397 A1 | 1/2015 | Jouaux | |
| 2015/0121464 A1 | 4/2015 | Hughes | |
| 2015/0127728 A1 | 5/2015 | Marti | |
| 2016/0055236 A1 | 2/2016 | Frank | |
| 2016/0104216 A1 | 4/2016 | Turner | |
| 2017/0213178 A1 | 7/2017 | Todd | |

OTHER PUBLICATIONS

Soliman et al., "Developing a mobile location-based collaborative Recommender System for GIS applications," doi: 10.1109/ICCES. 2015.7393058, 2015, pp. 267-273 (Year: 2015).*

Henry, Alan, "Five Best File Encryption Tools," Feb. 8, 2015 [retrieved online at https://lifehacker.com/five-best-file-encryption-tools-5677725 on Sep. 6, 2018].

Suterwalas, Abbas, "Mastering Database Storage and Retrieval in Android," Oct. 15, 2012 [retrieved online at https://www.sitepoint.com/using-database-in-android/ on Sep. 6, 2018].

International Application No. PCT/US2016/036774, International Search Report and Written Opinion dated Sep. 20, 2016.

* cited by examiner

SYSTEMS AND METHODS OF USING GEOLOCATION VERIFICATION

CROSS-REFERENCE TO RELATED APPLICATIONS

This application is a continuation of U.S. nonprovisional application Ser. No. 15/178,538, filed Jun. 9, 2016, which claims priority to U.S. provisional application No. 62/173,347, filed Jun. 9, 2015, which is incorporated herein by reference for all purposes.

FIELD

The present teachings relate generally to systems and methods of providing a geolocation verification system. More specifically, the present teachings relate to systems and methods of using geolocation coordinates to verify an individual's presence at a represented location or a reviewer's presence at a represented location so that the individual or reviewer is authorized to submit inputs, such as reviews, commentary, pictures, insights, or the like, about the represented location, for viewing by other individuals who are interested in that represented location.

BACKGROUND

Typically, people may electronically check-in to a location with a computerized device, such as a smartphone, tablet, or laptop computer, to claim presence at a represented location. Having done so, these people submit one or more inputs, i.e., content of submissions such as reviews, commentary, pictures, insights, and the like, about the represented location. Such publications, however, lack reliability, because they are based on these peoples' representations that they were present at these represented locations at certain times, when they in fact may not have been present. What is therefore needed are systems and methods that facilitate publishing reliable information for and from the public at large.

SUMMARY OF THE INVENTION

In one aspect, the present teachings disclose a method for displaying one or more submissions. One such exemplar method includes: (i) accepting, from a client device, a representation of a reviewer's presence at a represented location, and wherein the client device is associated with the reviewer and the reviewer is one who intends to submit one or more inputs relating to the represented location; (ii) receiving location coordinates of a location-enabled device when the reviewer represents being present at the represented location and the location-enabled device is proximate to and/or in possession of the reviewer; (iii) deeming the reviewer as an authorized reviewer of the represented location if the location coordinates of the location-enabled device are within a predefined threshold area around the represented location when the reviewer represents being present at the represented location; and (v) causing to be displayed, on one or more of the client devices, one or more submissions relating to the represented location received from the authorized reviewer of the represented location. In certain embodiments of the present teachings, the above-mentioned steps of accepting and receiving occur contemporaneously.

In one implementation of the present teachings, the step of causing to be displayed is carried out by a server that only causes to display one or more submissions relating to the represented location received from the authorized reviewer of the represented location. In another implementation of the present teachings, in the step of causing to be displayed, the client device only allows an authorized reviewer of the represented location to provide one or more submissions relating to the represented location. Regardless of the implementation effected, the authorized reviewer of the represented location is free to provide one or more of the submissions regarding the represented location when the authorized reviewer is no longer present at, or is remote to, the represented location. In other words, once the reviewer is deemed authorized to submit reviews about a represented location, then she/he is able to provide one or more submission regarding the represented location even though she/he is no longer present at the represented location.

In another aspect, the present teachings disclose another method for displaying one or more submissions. One such exemplar method includes: (i) accepting, from a client device, a representation of a reviewer's presence at a represented location, and wherein the client device is associated with the reviewer and the reviewer is one who intends to submit one or more inputs relating to the represented location; (ii) receiving location coordinates of a location-enabled device when the reviewer represents being present at the represented location and the location-enabled device is proximate to and/or in possession of the reviewer; (iii) tracking a duration of the authorized reviewer's presence at the represented location by monitoring a period of time the location-enabled device is present, using the location coordinates, within a predefined threshold area around the represented location; (iv) deeming the reviewer as an authorized reviewer of the represented location if the period of time of the authorized reviewer's presence at the represented location equals or exceeds a predefined threshold period; and (v) causing to be displayed, on one or more of the client devices, one or more submissions relating to the represented location received from the authorized reviewer of the represented location. According to one embodiment of the present teachings, the threshold period of time is determined relative to a size and/or a complexity of the represented location. By way of example, the larger the area and/or the more complex the represented location, the more time the reviewer is expected to spend at the represented location, and, accordingly, the threshold period of time is a relatively higher value than for smaller and/or less complex locations. A complex location may include more different types of living spaces and/or facilities than a less complex location.

The method for displaying one or more submissions may include compiling a list of authorized reviewers of a represented location. One such exemplar list includes providing updates regarding the represented location to authorizer reviewers of the represented location in the list. The method may yet also include providing the list to one or more parties interested in transacting for or the represented location.

In one preferred embodiment of the present teachings, the represented location is a real estate property that is for sale or for lease and the authorized reviewer is a real estate agent.

According to one embodiment of the present teachings, the above-mentioned step of tracking provides a plurality of durations when one or more of the authorized reviewers are present at the represented location and assigning different weights to one or more submissions from each of the authorized reviewers based on the duration or the total duration of the authorized reviewer's presence at the represented location. According to another embodiment of the present teachings, tracking provides a plurality of durations when one or more of the authorized reviewers of a represented location are present at the represented location and accounting for the duration of each of the authorized reviewer's presence at the represented location to arrive at a rank and/or a reliability score for each of the authorized reviewers of the represented location. Each of the steps of tracking and causing to display may be carried out using a server and/or client device. The method may also include visually representing the rank and/or the reliability score associated with each of the authorized reviewers of a represented location.

In yet another aspect, the present teachings disclose a method for providing a location-based service. One such exemplar method includes: (i) accepting, from a client device, a representation of an individual's presence at a represented location, and wherein the client device is associated with the individual and the individual is one who intends to submit one or more inputs relating to the represented location; (ii) receiving location coordinates of a location-enabled device when the individual represents being present at the represented location and the location-enabled device is proximate to and/or in possession of the individual; (iii) verifying the individual's presence at the represented location if the location coordinates of the location-enabled device are within a predefined threshold area around the represented location when the individual represents being present at the represented location; and (iv) causing to be displayed, on one or more of the client devices, an indication confirming presence of the individual at the represented location when the individual represents being present at the represented location.

In yet another aspect, the present teachings disclose a network-based system for displaying one or more submissions. One such exemplar system includes: (i) a processor for executing code; (ii) memory, coupled to the processor, for storing code to be executed by the processor; (iii) at least one interface or display, coupled to the processor, operable to provide a communication link from the processor to one or more client devices and that is used for transmitting and/or receiving information; and wherein the processor performs operations of: (a) accepting, from the client device, a representation of a reviewer's presence at a represented location, and wherein the client device is associated with the reviewer and the reviewer is one who intends to submit one or more inputs relating to the represented location; (b) receiving location coordinates of a location-enabled device when the reviewer represents being present at the represented location and the location-enabled device is proximate and/or in possession of the reviewer; (c) deeming the reviewer as an authorized reviewer of the represented location if the location coordinates of the location-enabled device are within a predefined threshold area around the represented location when the reviewer represents being present at the represented location; and (d) causing to be displayed, on one or more of the client devices, one or more submissions relating to the represented location received from the authorized reviewer of the represented location. Preferably, the location-enabled device is a global positioning system that is integrated in the client device. Further, the location-enabled device may not be the same as and operates independent of the client device.

In yet another aspect, the present teachings disclose another network-based system for displaying one or more submissions. One such exemplar system includes: (i) a processor for executing code; (ii) memory, coupled to the processor, for storing code to be executed by the processor; (iii) at least one interface or display, coupled to the processor, operable to provide a communication link from the processor to one or more client devices and that is used for transmitting and/or receiving information; and wherein the processor performs operations of: (a) accepting, from the client device, a representation of a reviewer's presence at a represented location, and wherein the client device is associated with the reviewer and the reviewer is one who intends to submit one or more inputs relating to the represented location; (b) receiving location coordinates of a location-enabled device when the reviewer represents being present at the represented location and the location-enabled device is proximate and/or in possession of the reviewer; (c) tracking a time duration when the authorized reviewer is present at the represented location by monitoring a period of time the location-enabled device is present, using the location coordinates, within a predefined threshold area around the represented location; (d) deeming the reviewer as an authorized reviewer of the represented location if the period of time of the authorized reviewer's presence at the represented location equals or exceeds a predefined threshold period; and (e) causing to be displayed, on one or more of the client devices, one or more submissions relating to the represented location received from the authorized reviewer of the represented location.

DETAILED DESCRIPTION OF THE PREFERRED EMBODIMENTS

Embodiments of the present arrangements and teachings now may be described more fully hereinafter with reference to the accompanying figures, in which some, but not all, embodiments of the arrangements and teachings are shown. These arrangements and teachings may be embodied in many different forms and should not be construed as limited to the embodiments set forth herein; rather, these embodiments are provided so that this disclosure may satisfy applicable legal requirements.

Figure 1:
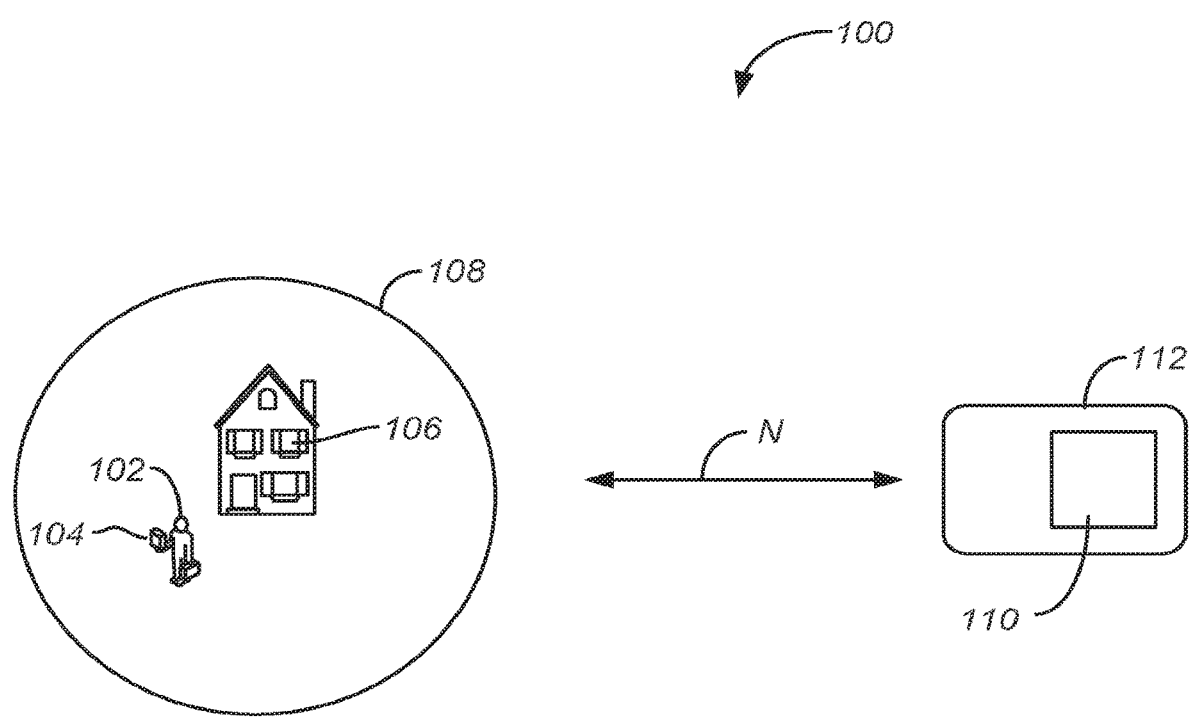
FIG. 1 is a diagram of certain salient components of a geolocation verification system, according to one embodiment of the present arrangements.

The teachings and arrangements disclosed herein are directed to, among other things, systems and methods for providing geolocation verification, displaying one or more submissions, and providing a location-based service. The present arrangements enable a website or application user to check-in electronically to a represented location that is associated with a merchant such that the merchant then verifies the user's presence at the represented location prior to authorizing that user to provide one or more inputs, reviews, or submissions (e.g., comments, descriptions, pictures, videos, insights, or critiques) regarding that represented location. As used herein, geocode or geolocation verification means using location-enabled technology, components, software, and/or techniques, including but not limited to OP S-enabled hardware and software, to verify a user's presence at a represented location. To this end, FIG. 1 shows certain salient components of a geolocation verification system 100, according to one embodiment of the present teachings. System 100 includes a user or reviewer 102, a location-enabled device 104, a represented location 106, a boundary 108, a server 110, a merchant or a service provider 112, and a wireless communication network N.

Reviewer 102 is any individual who seeks authorization to submit, provide, or make available one or more submissions, reviews, or inputs about a represented location. According to one embodiment of the present teachings, reviewer 102 is one who seeks authorization to submit one or more reviews about a represented location that is associated with a merchant (explained in further detail below). Accordingly, reviewer 102 may be an account holder with a merchant. By way of example, reviewer 102 may be a diner who is an account holder with and seeks authorization to submit a restaurant review to a third-party review website (e.g., Yelp). By way of another example, reviewer 102 may be a real estate agent who seeks authorization to submit content about a real estate listing on a website or application that provides real estate services to, among others, prospective buyers and their representatives who may use and/or subscribe to the same service, so as to facilitate real estate transactions. In this example, merchant 112 may be thought of as a "real estate services provider."

Location-enabled device 104 is any computer or electronic device that is capable of wirelessly transmitting location information about the device to a server for determining the device's location. Preferably, location-enabled device 104 is a OPS-enabled device, and more preferably, a hand-held OPS-enabled device, such as a smartphone. The present teachings, however, contemplate the use of any location-enabled device, including but not limited to a desktop computer, a laptop computer, a personal digital assistant, or the like, so long as the device can be used to deliver geolocation information that can be processed by a server to verify the reviewer's presence at a represented location. In certain preferred embodiments of the present teachings, location-enabled device 104 is configured to deliver location information to a server upon logging-in to a merchant (e.g., real estate services provider's) website or application. The present teachings, however, contemplate use of any technique well known to those of skill in the art for delivering geolocation information from a location-enabled device to a server. In certain embodiments of the present teachings, a location-enabled device is a client device.

As used herein, device 104 may be thought as being associated with reviewer 102 such that the location of device 104 may be used to determine the location of reviewer 102. In other words, when reviewer 102 uses device 104 to check-in to a represented location, the present teachings recognize that the location of device 104 that is determined is the same as or substantially similar to the location of reviewer 102. In certain embodiments of the present teachings, a device being associated with a reviewer means that the device is proximate to, and/or within possession of, the reviewer.

Represented location 106 is any location for which reviewer or an individual 102 seeks authorization to submit one or more inputs, submissions, or reviews based, at least in part, on the reviewer's or the individual's verified presence at that location. The present teachings contemplate use of any geographic location, as well as any combination thereof, including but not limited to undeveloped land, a building, a structure, a landmark, a business, a real estate listing, a restaurant, a store, or the like. Likewise, represented location 106 may include an indoor area, an outdoor area, or a combination of both. According to one preferred embodiment of the present teachings, represented location 106 is a real estate property that is for sale or for lease. Represented location 106 may be thought of as a location that reviewer or an individual 102 represents where she/he is present.

In certain embodiments of the present teachings, represented location 106 is where a service or task is performed. According to such embodiments, individual 102 seeks authorization to submit one or more inputs, submissions, or reviews about the service or task that is performed, including whether the service or task was performed or completed.

Boundary 108 is a perimeter that surrounds at least a part of represented location 106. According to one preferred embodiment of the present teachings, presence of reviewer or individual 102 within the area surrounded by boundary 108 means that reviewer or individual 102 is within a "predetermined threshold area" of represented location 106.

A predetermined threshold area may be determined relative to the size of represented location 106. In certain embodiments of the present teachings, determining a predefined threshold area includes using a radius from a center point of a represented location that is sufficient to produce an area that includes represented location 106. For example, a predetermined threshold area around a relatively small single-family home may be determined by identifying location coordinates at the center point of the home and then using a radius of about 10 meters from that point to calculate the predetermined threshold area, which includes that home. Similarly, a parcel of land that has an area of about 1 km$^2$ may require using a radius of about 1.5 km in a similar manner. In other embodiments of the present teaching, determining a predefined threshold area may include defining a boundary that is a certain distance from the periphery or perimeter of a represented location and calculating the area within that boundary.

The present teachings recognize that use of a predefined threshold area may avoid certain limitations associated with using or implementing geolocation systems (e.g., GPS) to verify a reviewer's or individual's presence at a represented location. For example, accuracy limitations associated with some geolocation systems may prevent distinguishing between a reviewer's or individual's presence near a represented location, as opposed to a reviewer's or individual's presence at or in a represented location. Similarly, if a geolocation system is programmed to associate one set of location coordinates (or a limited number of sets of location coordinates) with a represented location, such as the center point of a piece of land, then an individual or reviewer who is present on that land, but not present at the precise programmed location coordinates, may be incorrectly determined not to be present at that represented location. Accordingly, and to account for these and other limitations associated with certain geolocation systems, in preferred embodiments of the present teachings, verified presence of a reviewer or individual 102 within a predetermined threshold area around represented location 106 constitutes verified presence of that individual or reviewer at represented location 106. In other embodiments of the present teachings, however, a predetermined threshold area is not used to determine the presence of a reviewer or individual at a represented location.

Server 110 is any server and/or components thereof used to implement the various embodiments of the present teachings systems. Though servers are explained in further detail below with reference to servers 210 and 310 of FIGS. 2 and 3, respectively, it is important to note that server servers of the present teachings and arrangements are configured to store and process geolocation information, including geolocation information about represented location 106 and the area within boundary 108, and to receive and process geolocation information associated with device 104. Server 110 may also be configured to process user identification information (e.g., log-in credentials of reviewer 102), authorize reviewer or individual 102 to submit one or more inputs, submissions, or reviews, about represented location 106, compile and deliver visual representations of inputs submitted by reviewer or individual 102, and perform other functions necessary to practice the teachings of the present disclosures.

Preferably, server 110 is associated with merchant 112, which may operate, utilize, and/or implement the server. As used herein, merchant 112 is any business, organization, or agency, such as a service provider (e.g., areal estate services provider), manufacturer, retailer, event provider, supplier and/or non-profit entity that implements the systems or methods of the present teachings. Although certain embodiments of the present teachings are described as involving a merchant, it will be understood that the merchant may involve one or more persons, organizations, businesses, institutions, and/or other entities that implement one or more portions of one or more of the embodiments described herein. In one preferred embodiment of the present teachings, a merchant is a company that may provide real estate services to real estate agents, real estate buyers, and/or real estate sellers. Accordingly, the systems and methods of the present teachings disclosed herein may be used to verify a real estate agent's presence at a represented location (e.g., a listed real estate property) as a basis for authorizing that agent to post reviews or other content, preferably accessible through a website or application delivered by a server to one or more client devices, about the represented location. For example, and without limitation, a real estate agent may post content on a website or application describing the represented location, visually representing the represented location through pictures or video, describing the represented location's surrounding areas, describing the history or condition of the represented location, and critiquing the represented location and surrounding areas.

In certain embodiments of the present teachings, reviewer or individual 102 establishes an account with merchant 110. Examples of accounts include a password-enabled user profile that allows a reviewer or an individual to log into the account wirelessly. The account may, among other things, provide access to certain services provided by the merchant, such as providing access for reviewers or individuals to post reviews about one or more represented locations, preferably online, and providing access for other persons (e.g., users who are not reviewers) to access those reviews.

According to one preferred embodiment of the present teachings, reviewer or individual 102 logging into an account using location-enabled device 104 transmits location information (e.g., GPS coordinates) via network N to server 110, which is associated with merchant 112. Network N may be thought of any network that is capable of delivering geolocation information, preferably wirelessly, between device 104 and server 110. Server 110 may then be used to verify the presence of device 104 within boundary 108 to authorize reviewer 102 to post one or more inputs or submissions about represented location 106. To this end, FIG. 2A is a block diagram showing certain salient components of a computer platform system 200, according to one embodiment of the present arrangements and for implementing a geocode verification system (e.g., geocode verification system 100 of FIG. 1).

Figure 2A:
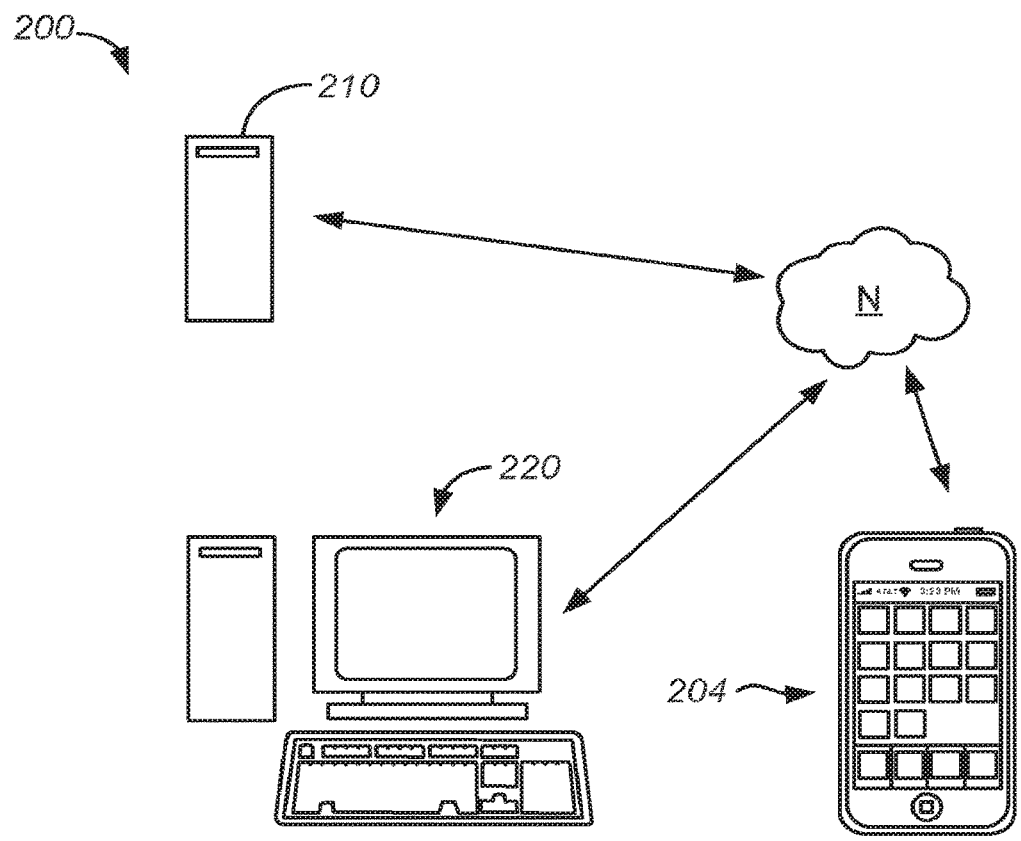
FIG. 2A is a diagram of a computer platform system, according to one embodiment of the present arrangements, used to implement the geolocation verification system of FIG. 1.

FIG. 2A includes a location-enabled device 204, a server 210, and a client device 220, communicating with each other over a network N. Server 210 and location-enabled device 204 are substantially similar to their counterparts described above with reference to FIG. 1, i.e., location-enabled device 104 and server 110. Except as indicated below with reference to FIG. 2B, client device 220 is substantially similar to location-enabled device 204, though unlike location-enabled device 104, which requires positioning/location (e.g., GPS) hardware, client device 220 may optionally include such positioning/location hardware and associated programming and software. According to one preferred embodiment of the present arrangements, device 204 is a wireless device, and network N includes wireless communication between device 204 and server 210.

Figure 2B:
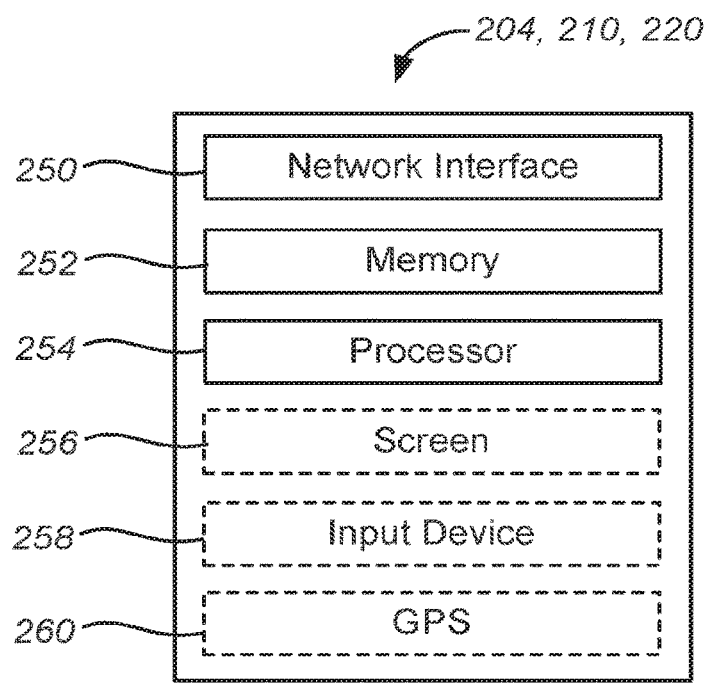
FIG. 2B shows certain details of components shown in FIG. 1A.

FIG. 2B shows the structure of certain components of FIG. 2A. As shown in FIG. 2B, devices 204, 210, and 220 each may include their own network interface 250, memory 252, processor 254, screen 256, input device 258, and positioning/location (e.g., GPS) hardware 260, as well as software necessary to implement these hardware components. According to certain embodiments of the present arrangements, however, certain of these features are optionally included. By way of example, server 210 may optionally include screen 256 and input device 258. Similarly, client device 220 may optionally include positioning/location hardware 260. The present teachings contemplate use of any network interface 250, memory 252, processor 254, screen 256, input device 258, and/or positioning/location hardware 260 well known to those of skill in the art that is sufficient to facilitate implementation of the geolocation verification systems and methods disclose herein.

Server 210 is a computer or a network of computers, preferably including one or more data storage devices. Server 210 may produce programming instructions, files, or data that may be transmitted over network N to user devices 204 and/or 220, either of which may be used by a user to enter a protocol, to run a protocol, including entering data, and/or analyze data stored on server 210. It is to be understood that network interface 250, memory 252, and processor 254 of server 210 are configured such that a program stored in the memory may be executed by the processor to accept input and/or provide output through the network interface over network N to device 204 and/or device 220.

Network interface 250 of devices 204 and/or 220 is used to communicate with server 210 over a wireless network, such as a cellular telephone network, a WiFi network, or a WiMax network. Memory 252 of devices 204, 210, and 220 includes programming required to operate these devices (such as an operating system or virtual machine instructions), and may include portions that store information or programming instructions obtained over network N, or that are input by the reviewer (such as written notes or images from a device camera (not shown). In one embodiment of the present arrangements, screen 256 and input device 258 of device 204 and/or device 220 is a touch screen, providing the functions of display and input.

In preferred embodiments of the present arrangements, as noted above, system 200 includes several components, including but not limited to server 210 and a plurality of user devices 204 and 220, which are programmed by an administer to cooperatively achieve one or more of the following functions: (1) check-in to a represented location (e.g., by a user inputting log-in information to an online merchant account), (2) wirelessly deliver location/positioning (e.g., GPS) coordinates between components, (3) store and/or process location/positioning coordinates to confirm presence of a location-enabled within a predetermined threshold area of a represented location; (4) authorize users to post inputs (e.g., online using a merchant website or application) based on verification of device location; and (5) provide visual representations confirming the status of one or more individual to post authorized reviews of a represented location.

Figure 3:
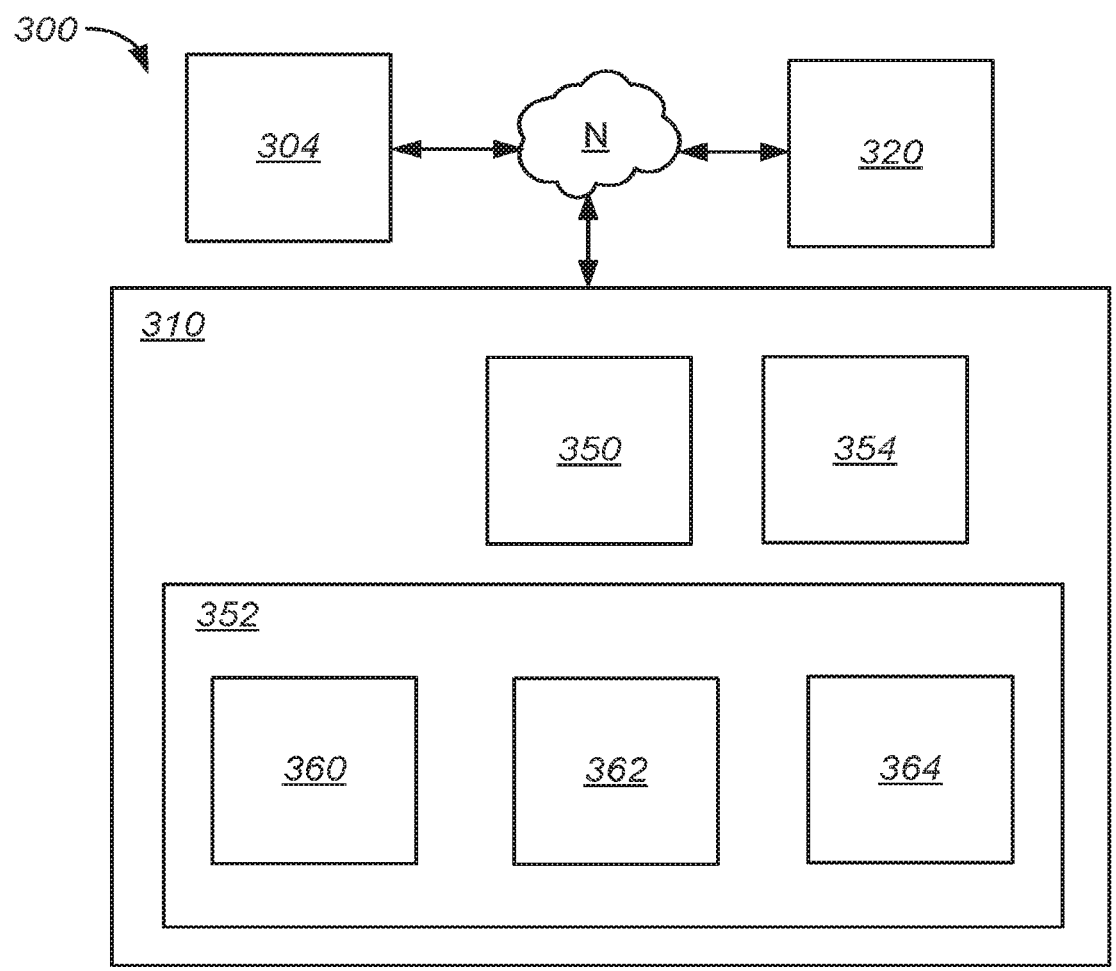
FIG. 3 is a diagram of certain salient components of a computer platform system, according to another embodiment of the present arrangements, used to implement the geolocation verification system of FIG. 1.

FIG. 3 is a block diagram of a computer system 300, according to another embodiment of the present teachings and for implementing a geocode verification system (e.g., geocode verification system 100 of FIG. 1). As shown in FIG. 3, computer system 300 includes a location-enabled device 304, a client device 320, and a server 310 communicating over a network N. Server 310 also includes a network interface 350, a processor 354, and a memory 352. Location-enabled device 304, client device 320, and server 310 are substantially similar to their counterparts in FIG. 2A, i.e., location-enabled device 204, client device 220, and server 210. Likewise, network interface 350, memory 352, and processor 354, are substantially similar to their counterparts in FIG. 2B, i.e., network interface 250, memory 252, and processor 254.

Server 310 is capable of storing and accessing multiple categories of information and/or data in memory 352, including, as shown in FIG. 3, certain types of information that facilitate implementation of the systems and methods disclosed herein. These may include, but are not limited to, programming 360 (e.g., for processor 354), user data 362, and geolocation data 364.

Data may be stored in memory by any method and using any component well known to those of skill in the art. For example and without limitation, in a relational database, or a document-oriented storage system, a non-relational No-SQL system, or an FTS-management system such as Lucene/Solar. The data may be stored as individual fields, or as one large JSON object, or as XML, or in any other format well known to those of skill in the art.

Programming 360 may include any programming that facilitates implementation of the systems and methods disclosed herein. By way of example, programming for system 300 may include programming to operate as a networking platform that is specific to the real estate market. Further, programming 360 may perform certain actions that are known in the art of web-based communications, such as allowing users, reviewers, or individuals to log-in to the system and to exchange information in various ways through the system, including but not limited to, allowing users, reviewers or individuals to post information on a website that is generally viewable by all persons or by only some persons. System 200 thus shares some common features of known social networking systems, but also includes inventive features related to the systems and methods of the present arrangements.

User data 362 may include any data associated with a user (e.g., reviewer 102 of FIG. 1) useful for facilitating implementation of the systems and methods disclosed herein. According to certain embodiments of the present teachings, user data includes, but is not limited to, log-in and/or identification data associated with a reviewer or an individual, a list of locations visited by a reviewer or an individual, a list of locations for which a reviewer or an individual has been authorized to post submissions about a represented location via system 300, a compilation of a reviewer's or individual's inputs, as well as any other information or data associated with a reviewer or an individual.

According to one embodiment of the present teachings, when a reviewer or an individual accesses system 300 through device 304, the system presents, on the corresponding screen (e.g., screen 256 of FIG. 2B), a screen that prompts a system-registered user to log-in by providing, e.g., a username and password. The reviewer's or the individual's data may be stored in user data 360.

Further, geolocation data 364 may include any data associated with a represented location (e.g., represented location 106 of FIG. 1) useful for facilitating implementation of the systems and methods disclosed herein. According to certain embodiments of the present teachings, geolocation data includes, but is not limited to, a reviewer's or individual's inputs associated with a represented location, as well as features or characteristics about specific represented locations and their surrounding areas.

Further still, geolocation data 364 may include any data associated with the positioning/location of a represented location (e.g., location or GPS coordinates). By way of example, geolocation data 364 may include the geolocation coordinates of a specific location, as well as the geolocation coordinates for boundaries (e.g., boundary 108 of FIG. 1) surrounding the represented location to establish a predefined threshold area around the represented location.

Though not shown in FIG. 3, other information or data may be stored in memory 352. For example, in those embodiments where system 300 is used to facilitate real estate transactions, memory 352 may include, without limitation, buyer data, seller data, third-party data, communication data, and any other data or information useful for facilitating implementation of the systems and methods of the present teachings to the desired end.

Figure 4:
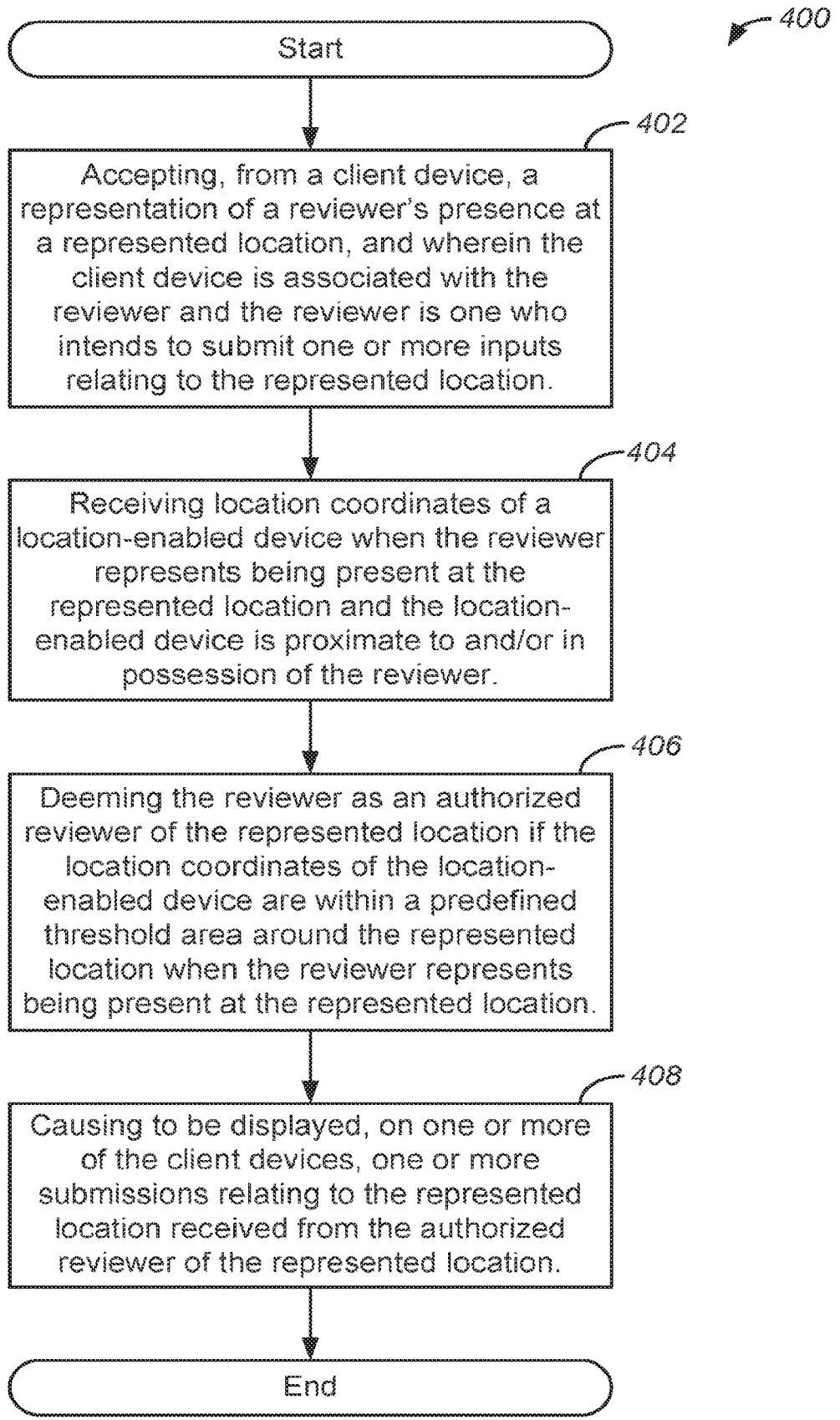
FIG. 4 is a flowchart showing certain salient steps of a process 400 for using geolocation verification, according to one embodiment of the present teachings, for displaying one or more submissions.

FIG. 4 is flowchart showing certain salient steps of a process 400, according to one embodiment of the present teachings, for any one of providing geolocation verification, displaying one or more submissions, or providing a location-based service. Process 400 begins with a step 402, which includes accepting, from a client device, a representation of a reviewer's or an individual's presence at a represented location. The client device is associated with the reviewer or the individual, preferably by being in possession of or proximate to the reviewer or the individual, and the reviewer or the individual intends to submit (e.g., to a merchant's website) one or more inputs or submissions relating to the represented location. Preferably, accepting in step 402 is carried out in part by a server (e.g., servers 110, 210, or 310 of FIGS. 1, 2A, and 3, respectively).

According to the embodiment of step 402, a reviewer uses a client device (e.g., client device 220 of FIG. 2A) to represent, to a server (e.g., server 110 of FIG. 1), the reviewer's presence at a represented location. The location may be thought of as a "represented location," because the reviewer's presence at this location is represented, but has not been verified (as will occur in later steps).

According to one embodiment of the present teachings, a reviewer or an individual uses a merchant website or an application to "check-in" to the represented location. Because checking in may only requires a reviewer's representation of presence at a specific represented location, a client device that is not location-enabled may be used. In other embodiments of the present teachings, however, a client device is a location-enabled device (e.g., location-enabled device 104 of FIG. 1), which may also be used in subsequent steps that require location-enabling features.

Next, process 400 includes a step 404, which includes receiving location coordinates of a location-enabled device when the reviewer or the individual represents being present at the represented location and the location-enabled device is proximate to and/or in possession of the reviewer or the individual. In certain embodiments of the present teachings, receiving location coordinates in step 404 is carried out contemporaneously with accepting a representation of the reviewer's or the individual's presence in step 402. For example, a reviewer may check-in to a represented location using a location-enabled device to facilitate step 404. In this example, a location-enabled device may be configured to transmit location coordinates to the server upon logging in to a merchant account. The client device, which may include the same location-enabled device, is used by the reviewer or the individual to represent her/his presence at a specific represented location according to step 402. In other embodiments of the present teachings, however, step 404 is carried out at a short period of time after the reviewer represents being present at the represented location. For example, a reviewer may represent being at a represented location before arriving at a represented location, but then later transmit location coordinates when present at the represented location.

Transmittal of location coordinates may be carried out over a network (e.g., network N of FIG. 2A) to the server. Such transmittal of a device's location/positioning coordinates may be facilitated by any technique or component well known to those of skill in the art for transmitting location coordinates to a server. In certain embodiments of the present teachings, the same server used in step 402 carries out step 404. Further, the server may use programming (e.g., programming 360 in FIG. 3) that is stored in its memory (e.g., memory 352 of FIG. 3) to process the location coordinates transmitted in step 402 to carry out step 404.

Next, a step 406 includes deeming the reviewer as an authorized reviewer of the represented location if the location coordinates of the location-enabled device are within a predefined threshold area around the represented location when the reviewer represents being present at the represented location. In other words, a reviewer is deemed "an authorized reviewer" of a represented location only after the reviewer's presence at the represented location has been verified by the geolocation verification systems of the present teachings. Deeming a reviewer as an authorized reviewer of a represented location provides a degree of reliability to the reviewer and for the benefit of those individuals who may rely on authorized reviews to evaluate or consider a represented location and/or a service provided at that represented location.

Due to certain limitations associated with location/positioning technology (as explained above with reference to boundary 108 of FIG. 1), a reviewer's presence at a represented location in step 406 is determined by verifying the reviewer's presence within a predefined threshold area around the represented location. In other words, the present teachings recognize that presence within a predefined threshold area constitutes presence at a specific represented location.

Geolocation coordinates associated with a predefined threshold area may be stored in a server's memory and/or be accessible by the server's programming. Thus, in step 406, if the server's programming determines that the location coordinates received in step 404 are within the relevant location coordinates of a predefined threshold area programmed in the server's memory, then the server authorizes the reviewer or the individual to provide one or more inputs or submissions about the represented location.

Once step 406 is carried out and a reviewer is deemed to be an authorized reviewer of a represented location, the authorized reviewer of that represented location may provide submissions (which include, without limitation, commentary, insights, reviews, opinions, pictures, videos, evaluations, and any other information related to the represented location) that are then displayed, by a server, on a merchant website or application that is viewable on a client device. To this end, next, a step 408 includes causing to be displayed, on one or more of the client devices, one or more submissions related to the represented location from the authorized reviewer of the represented location. Step 408 may be practiced, without limitation, by a server (e.g., server 110 of FIG. 1) that causes a reviewer's submissions to be displayed on the screens of client devices used by those interested in the represented location.

In certain embodiments of the present teachings, step 408 is practiced by a server that will only post submissions from authorized users of a represented location. In other words, while a reviewer may upload a review to a server, the server will only publish the review if it is received from an authorized reviewer of that represented location. In other embodiments of the present teachings, however, a reviewer who is not an authorized reviewer of a represented location will be prevented from using a client device to upload, to the server, a non-authorized review or submission.

Further, in preferred embodiments of the present teachings, an authorized reviewer of a represented location does not need to be present at that represented location in order to post an authorized review about that represented location. In other words, once a reviewer has been deemed an authorized reviewer of the represented location by the systems of the present teachings, then that authorized reviewer of the represented location may provide submissions and have the submissions published, regardless of the authorized reviewer's presence at the represented location when such submissions were prepared or uploaded to a server.

Figure 5:
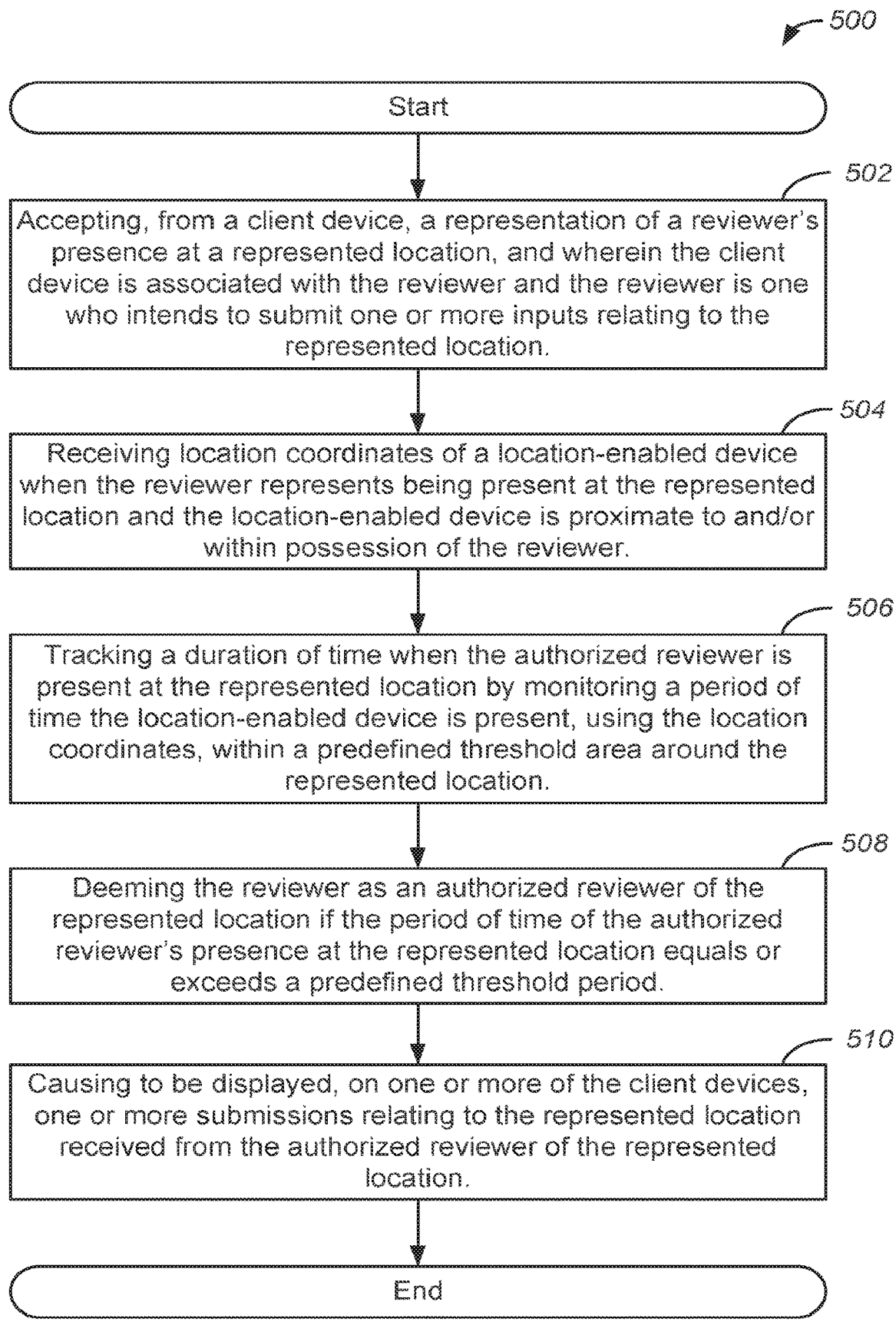
FIG. 5 is a flowchart showing certain salient steps of a process 500 for using geolocation verification, according to another embodiment of the present teachings, for displaying one or more submissions.

Though process 400 of FIG. 4 requires a reviewer's verified presence at a represented location to justify deeming that reviewer an authorized reviewer of that particular represented location, the present teachings recognize that stricter requirements may also be implemented. To this end, FIG. 5 is a flowchart showing certain salient steps of a process 500, according to another embodiment of the present teachings, for displaying one or more submissions. As explained in more detail below, unlike the embodiment of FIG. 4, which requires verified presence of a reviewer at a represented location of interest, a process 500 of FIG. 5 deems a reviewer as an authorized reviewer in connection with the represented location only if the reviewer or the individual is present at the represented location for a predetermined period of time.

Process 500 begins with a step 502, which includes accepting, from a client device, a representation of a reviewer's presence at a represented location, where the client device is associated with the reviewer and the reviewer is one who intends to submit one or more inputs related to the represented location. Next, a step 504 includes receiving location coordinates of a location-enabled device when the reviewer represents being present at the represented location and the location-enabled device is proximate to and/or within possession of the reviewer. Steps 502 and 504 are substantially similar to their counterparts described above with reference to FIG. 4, i.e., steps 402 and 404, respectively.

Next, a step 506 includes tracking a time duration when the reviewer is present at the represented location by monitoring a period of time the location-enabled device is present, using the represented location coordinates (i.e., the location coordinates received in step 504), within a predefined threshold area around the represented location. In other words, step 506 is used to determine how long a reviewer is present at the represented location. In certain embodiments of the present teachings, a period of time is determined during a single visit of the reviewer to the represented location. According to other embodiments of the present teachings, however, a period of time is cumulative based on multiple visits of the reviewer to the represented location.

Any technique well known to those of skill in the art may be used to track the presence of a location-enabled device within a predefined threshold area for a predetermined period of time. For example, a location-enabled device may be configured to deliver location information to a server at the times of logging in logging out of a merchant account. If the server confirms a reviewer's presence within a predefined threshold area at these times, then the server may use the difference between these times to track the presence of the location-enabled device within the predefined threshold area for at least the threshold amount of time. Similarly, a location-enabled device may be configured to deliver location information to a server periodically and/or continuously (e.g., when the same location-enabled device is logged in to a merchant account). The server may then process the location information to calculate the amount of time the location-enabled device was determined to be located within the predefined threshold area. To this end, next, a step 508 includes deeming the reviewer as an authorized reviewer of the represented location if the period of time of the authorized reviewer's presence at the represented location equals or exceeds a predefined threshold period.

According to one embodiment of the present teachings, a predefined threshold period is a fixed period of time for any location. For example, a restaurant-review website and service may require a user's presence at any restaurant for at least, e.g., 30 minutes, before authorizing a reviewer to post authorized reviews about that restaurant. According to another embodiment of the present teachings, however, a predefined threshold period of time is determined relative to a size and/or complexity of the location. For example, a real-estate-services provider may authorize a reviewer to post reviews of a small single-family home only when the reviewer's verified presence at that location exceeds, e.g., 30 minutes. Alternatively, the same real-estate-services provider may authorize a reviewer to post reviews of a large commercial office building only when the reviewer's verified presence at that location exceeds, e.g., 90 minutes.

Likewise, in those embodiments where a reviewer intends to review services offered at a location, rather than the location itself, the predetermined threshold period may be adjusted in a similar manner to account for the type of services being reviewed. The present teachings recognize that deeming a reviewer as an authorized reviewer of a represented location provides an indicia of reliability about an authorized reviewer's submissions regarding that represented location, or even about the authorized user himself or herself. Accordingly, certain parameters, such as a threshold period of time a reviewer is present at a location, may be adjusted to account for varying degrees of difficulty or complexity associated with a location or service to be reviewed such that the authorized review of a represented location may be considered sufficiently reliable.

Further, tracking time duration in step 506 may be practiced with respect to a plurality of reviewers of a represented location in order to distinguish authorized reviewers of a represented location and/or their authorized reviews of a represented location based on how much time each authorized reviewer spent at a particular represented location. For example, authorized reviews of a represented location may be weighed relative to how much time an authorized user spent at the represented location before reviewing that location. Similarly, authorized reviewers of a represented location may be ranked relative to each other or assigned reliability scores based, at least in part, on how much time each authorized review spent at a particular represented location or locations.

According to one embodiment of the present teachings, a ranking or assignment of reliability scores to authorized reviewers of a represented location is visually represented, preferably by a server and/or client device that is configured to deliver a visual representation of rankings or reliability score to the screens (e.g., screen 256 of FIG. 2B) of one or more client devices. In other words, the systems of the present teachings are configured to, among other things, transform location data about a reviewer's presence at a represented location into a visual display showing that a reviewer has become an authorized user of that represented location.

Next, a step 510 includes causing to be displayed, on one or more of the client devices, one or more submissions relating to the represented location received from the authorized reviewer of the represented location. Step 510 of FIG. 5 is substantially similar to its counterpart above, i.e., step 408 of FIG. 4.

In certain embodiments of the present teachings, process 400 of FIG. 4 and/or process 500 of FIG. 5 are each used to compile a list of authorized reviewers of a particular represented location. Such a list of authorized reviewers of a represented location may be used to provide certain advantages. For example, a list of authorized reviewers of a represented location may be used by a merchant to provide updates to the authorized reviewers about that represented location. Such a list may be used, for example, to prompt authorized viewers of the represented location to re-visit the represented location in order to maintain status as an authorized user of the represented location. Similarly, a list of authorized reviewers of the represented location may be provided to those interested in transacting at that represented location. For example, a list of real estate agents authorized to review a specific real estate property that is for sale may be provided to prospective buyers, who in turn may choose one particular real estate agent from that list for representation related to the specific real estate property.

According to one preferred embodiment of the present teachings, in process 400, a reviewer or an individual is a real estate agent, and the represented location (e.g., a real estate property) is a property listing displayed on a website and/or application that facilitates the sale of the represented location and the interaction of real estate agents and buyers and sellers of the represented location. To this end, FIGS. 6A-6E shows exemplar screenshots delivered by a server to a location-enabled device associated with a real estate agent to facilitate the practice of process 400 and/or 500 of FIGS. 4 and 5, respectively.

Figure 6A:
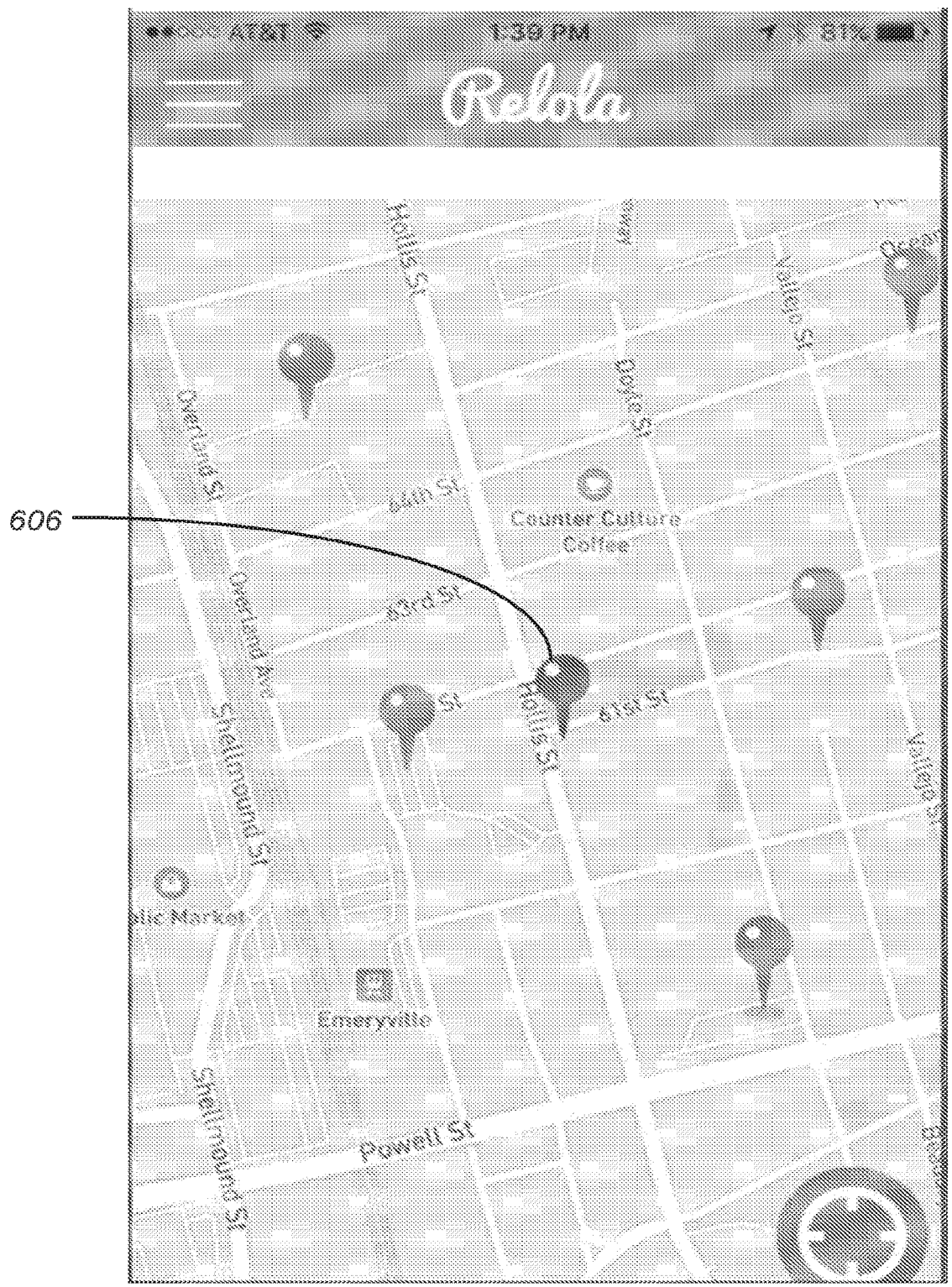
FIGS. 6A-6E are various exemplar screenshots provided by the systems of the present teachings to a real estate agent seeking authorization to submit authorized reviews of a real estate listing.

FIG. 6A is an exemplar screenshot of a map displaying various real estate listings, including for a location 606 for which a real estate agent seeks authorization to post reviews, on a reviewer's client device. Providing such a display or real estate listings may be used by a reviewer to represent that reviewer's presence at a property listing (e.g., as explained with reference to steps 402 and 502 of FIGS. 4 and 5, respectively).

Figure 6B:
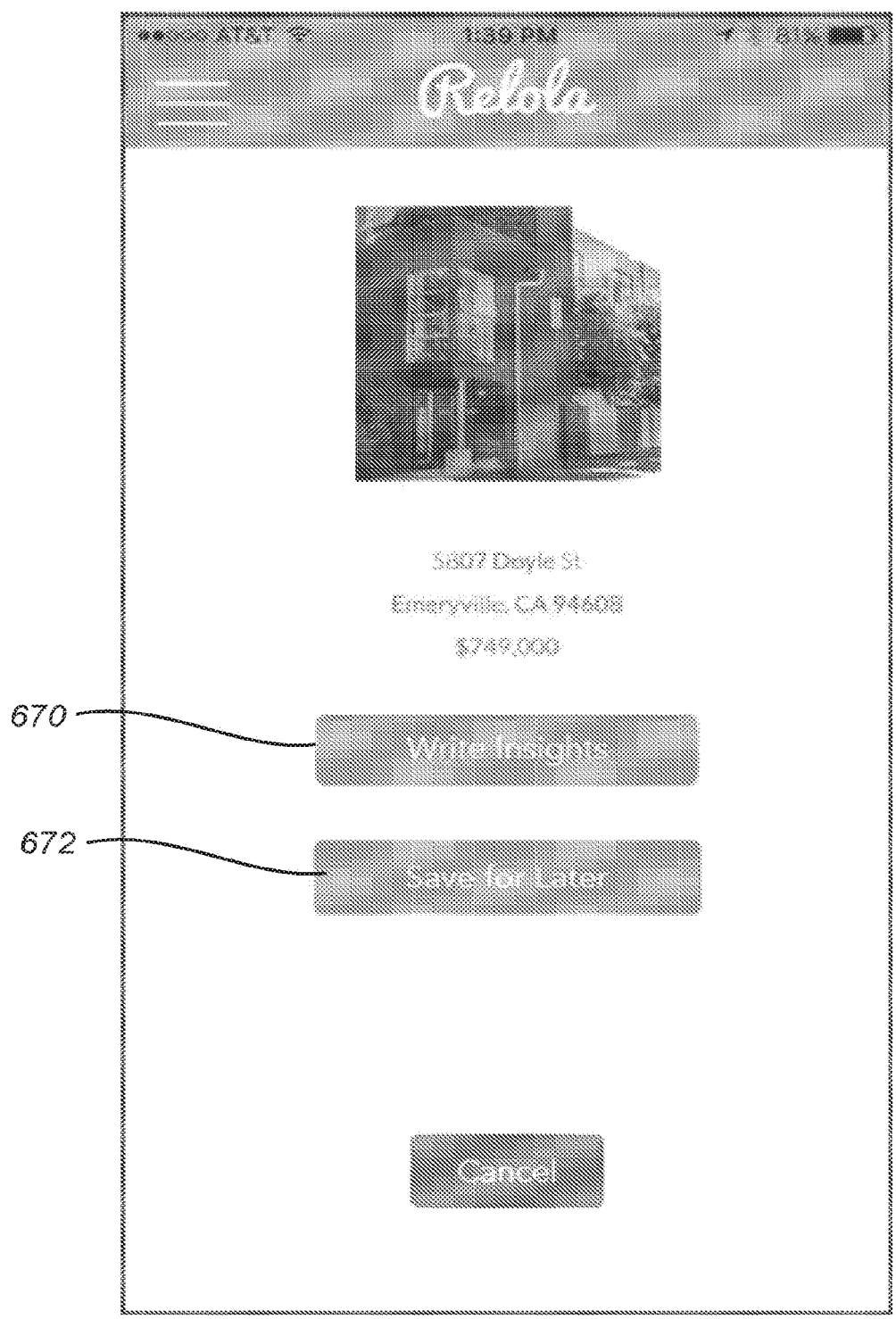
Figure 6C:
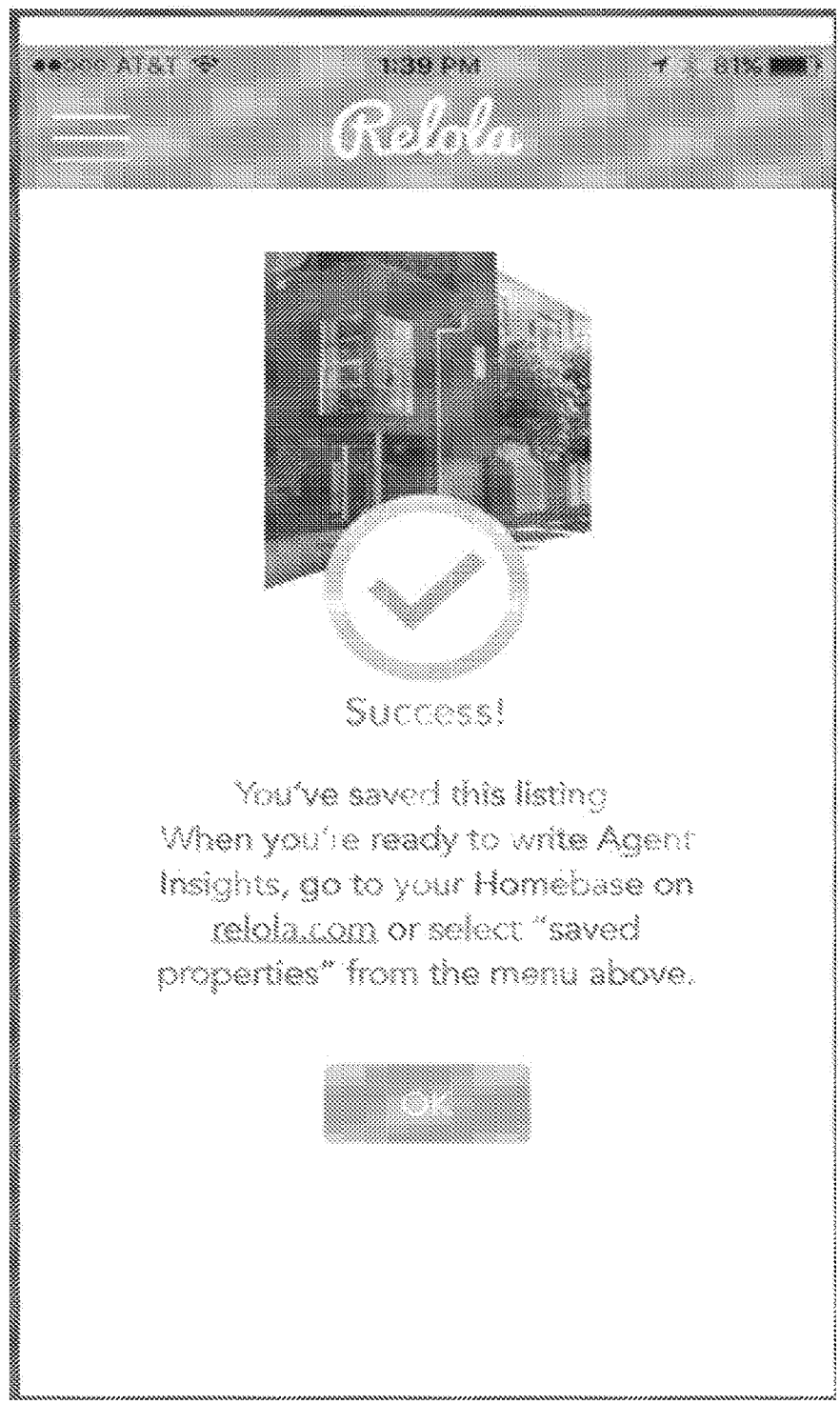

FIG. 6B is an exemplar screen shot that is delivered to a reviewer's client device after the user has been deemed an authorized user of a represented location (e.g., as explained above with reference to steps 406 and 508 of FIGS. 4 and 5, respectively). As shown in FIG. 6B, a button 670 may be pressed to allow a reviewer to begin inputting submissions related to the represented location shown in FIG. 6A. Similarly, a button 672 may be pressed to prompt storing the location (e.g., to geolocation data 364 in memory 352 of FIG. 3) so that the reviewer may submit reviews related to the location at a later time. To this end, FIG. 6C shows an exemplar screenshot delivered to a client device confirming that the real estate agent is authorized to submit reviews about the property listing at a later time (i.e., when the real estate agent is no long longer present at the property).

Figure 6D:
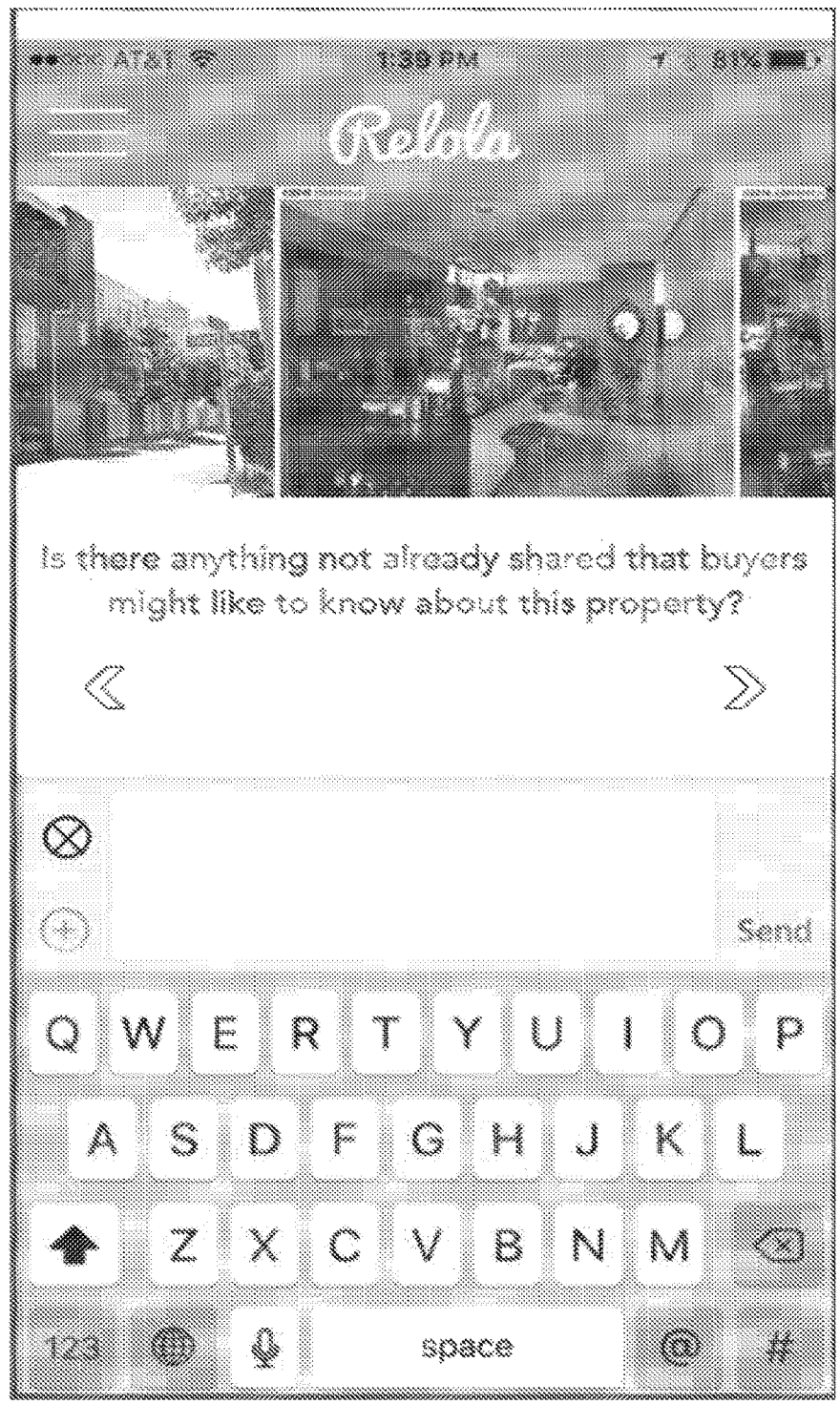
Figure 6E:
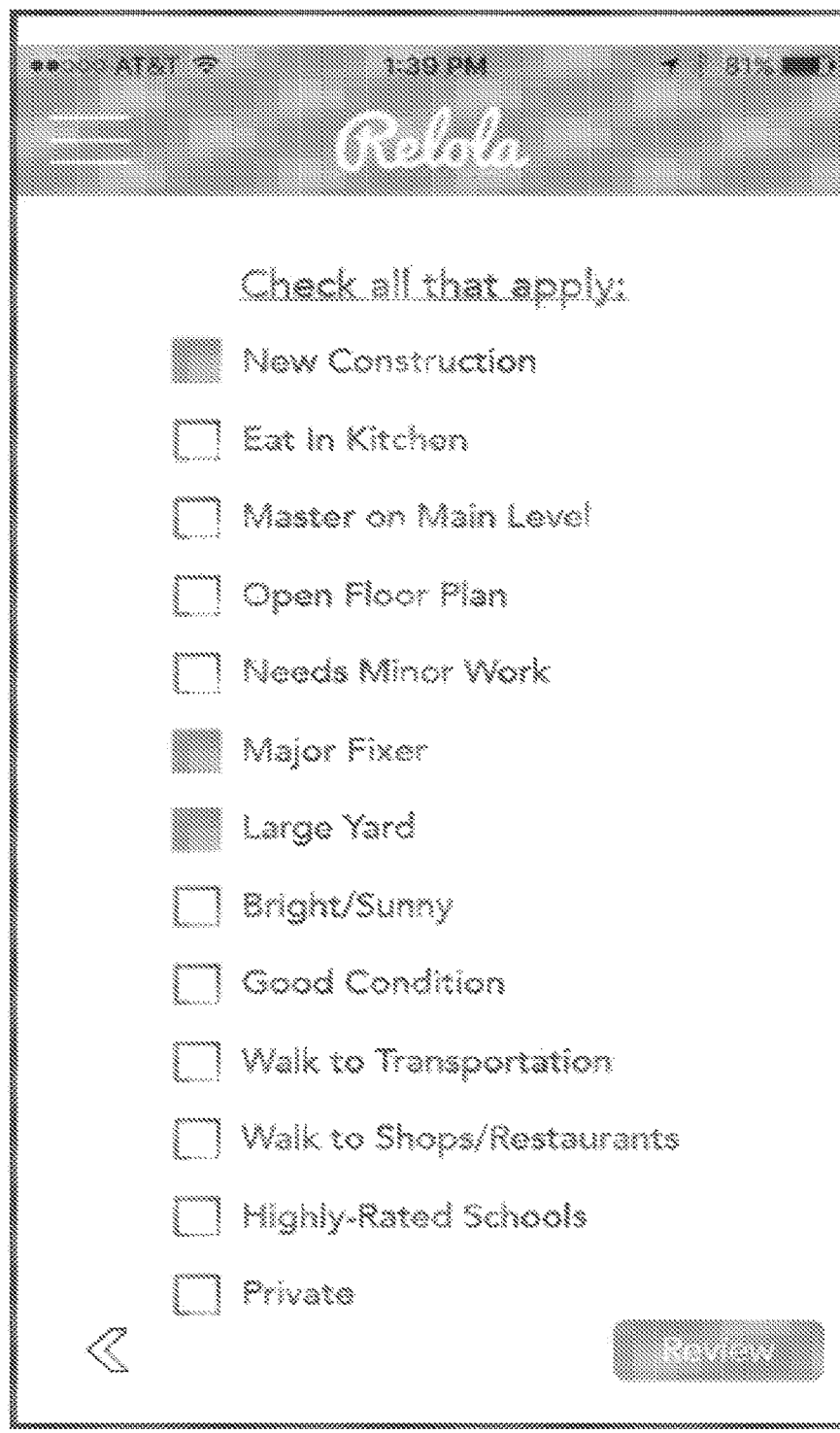

Further, FIGS. 6D and 6E are exemplar screenshots delivered by a server to a reviewer's client device for facilitating entry of inputs, submissions, or reviews related to the property listing. For example, FIG. 6D shown a screenshot where a real estate agent may input answers to specific questions about a property listing such that the answers will be accessible to, among others, interested buyers. Similarly, FIG. 6E shows a list of features and/or evaluations a real estate agent may check-off to provide additional insights about a property listing.

It is noteworthy that the systems and teachings of the present disclosure may also be used to confirm, or facilitate confirmation of, the performance of location-based services by a user who may also be thought of as a "service provider." In particular, the systems and teachings of the present disclosures may be used to confirm a service provider's presence, as well as the duration of the service provider's presence, at a location where a service was to have been performed. Providing such confirmation facilitates a degree of reliability that the service was in fact carried out or performed.

To accomplish this, as with a reviewer in steps 402 and 502 of FIGS. 4 and 5, respectively, a service provider first represents his or her presence at a represented location, preferably during a time when the service provider is to have carried out a service. Then, contemporaneously or separately from this, the service provider transmits location coordinates of a location-enabled device (which is in the possession of and/or proximate to the service provider) to a server. In certain embodiments of the present teachings, the time duration spent at the represented location is also tracked (e.g., in a similar manner to that described above with reference to step 506 of FIG. 5). Then, if the service provider's presence at the represented location, or within a predetermined threshold area around the represented location, is verified (e.g., as explained above with reference to step 406 of FIG. 4), or if the service provider's presence at the represented location, or within a predetermined area around the represented location, equals or exceeds a predefined threshold period (e.g., as explained above with reference to step 508 of FIG. 5), then the service provider will be deemed to have carried out or performed the service. In other embodiments of the present teachings, however, a service provider's presence at a location and/or presence at a location for a sufficient period of time is only one factor in deeming whether a service provider has carried out or performed a service.

Then, in certain embodiments of the present teachings, an indication that a service provider was present at a location or present at a represented location for a threshold period of time may be caused to be displayed. For example, an e-mail or a web page may display an indication that a service provider was present at a represented location and/or present at that location for a threshold period of time (e.g., as explained above with reference to steps 408 and 510 of FIGS. 4 and 5, respectively).

According to one embodiment of the present teachings, a service provider is at least one member chosen from a group comprising and onsite Health Care worker, dog walker, forest worker, lighthouse operator, house cleaner, gardener, baby sitter, spy, scavenger hunter, secret shopper, appraiser, pool cleaner, and a performer. The present teachings, however, contemplate verifying the presence of any service provider who performs a location-based service.

Although illustrative embodiments of the present teachings have been shown and described, other modifications, changes, and substitutions are intended. Accordingly, it is appropriate that the appended claims be construed broadly and in a manner consistent with the scope of the disclosure, as set forth in the following claims.

What is claimed:

1. A method comprising:
receiving a representation of a first perspective reviewer, from a first client device, the representation of the first perspective reviewer indicating a first reviewer's presence at a particular location, the first client device being associated with the first perspective reviewer and the first perspective reviewer being one who intends to submit one or more submissions relating to the particular location;
receiving location coordinates of a location-enabled device from the first perspective reviewer, the location-enabled device being proximate to the first perspective reviewer when providing the location coordinates;
tracking a first time duration when the first perspective reviewer is present at the particular location by monitoring a time period the location-enabled device is present, using the location coordinates, within a predefined threshold distance to the particular location;
deeming the first perspective reviewer as a first authorized reviewer of the particular location if the first time duration equals or exceeds a threshold of time, the threshold of time being based on a size of the particular location;
assigning a first reliability score to submissions related to the particular location from the first authorized reviewer based at least on the first time duration;
receiving a representation of a second perspective reviewer, from a second client device, the representation of the second perspective reviewer indicating a second reviewer's presence at the particular location, the second client device being associated with the second perspective reviewer and the second perspective reviewer being one who intends to submit the one or more submissions relating to the particular location;

tracking a second time duration when the second perspective reviewer is present at the particular location by monitoring the time period the location-enabled device is present, using the location coordinates, within the predefined threshold distance to the particular location;

deeming the second perspective reviewer as a second authorized reviewer of the particular location if the second time duration equals or exceeds the threshold of time;

assigning a second reliability score to submissions related to the particular location from the second authorized reviewer based at least on the second time duration; and providing the one or more submissions from the first authorized reviewer and the second authorized reviewer regarding the particular location to be provided to one or more other client devices in a particular order based at least on the first reliability score and the second reliability score.

2. The method of claim 1, wherein the second time duration is longer than the first time duration.

3. The method of claim 2, wherein the submissions related to the particular location from the second authorized reviewer are provided before the submissions related to the particular location from the first authorized reviewer.

4. The method of claim 1, wherein the particular location is a real estate property that is for sale or for lease and the authorized reviewer is a real estate agent.

5. The method of claim 1, further comprising compiling a list of authorized reviewers for the particular location, the list of authorized reviewers including the authorized reviewer.

6. The method of claim 5, further comprising providing updates regarding the particular location to the authorized reviewers for the particular location on the list of authorized reviewers.

7. The method of claim 5, further comprising providing the list to one or more parties interested in acquiring a property interest in the particular location.

8. The method of claim 1, wherein the predefined threshold distance is determined based on the size of the particular location.

9. The method of claim 1, further comprising receiving the one or more submissions from the first authorized reviewer when the first authorized reviewer is no longer present or is remote to the particular location.

10. A non-transitory computer readable medium comprising code executable by a processor to perform a method, the method comprising:

receiving a representation of a first perspective reviewer, from a first client device, the representation of the first perspective reviewer indicating a first reviewer's presence at a particular location, the first client device being associated with the first perspective reviewer and the first perspective reviewer being one who intends to submit one or more submissions relating to the particular location;

receiving location coordinates of a location-enabled device from the first perspective reviewer, the location-enabled device being proximate to the first perspective reviewer when providing the location coordinates;

tracking a first time duration when the first perspective reviewer is present at the particular location by monitoring a time period the location-enabled device is present, using the location coordinates, within a predefined threshold distance to the particular location;

deeming the first perspective reviewer as a first authorized reviewer of the particular location if the first time duration equals or exceeds a threshold of time, the threshold of time being based on a size of the particular location; assigning a first reliability score to submissions related to the particular location from the first authorized reviewer based at least on the first time duration;

receiving a representation of a second perspective reviewer, from a second client device, the representation of the second perspective reviewer indicating a second reviewer's presence at the particular location, the second client device being associated with the second perspective reviewer and the second perspective reviewer being one who intends to submit the one or more submissions relating to the particular location;

tracking a second time duration when the second perspective reviewer is present at the particular location by monitoring the time period the location-enabled device is present, using the location coordinates, within the predefined threshold distance to the particular location;

deeming the second perspective reviewer as a second authorized reviewer of the particular location if the second time duration equals or exceeds the threshold of time;

assigning a second reliability score to submissions related to the particular location from the second authorized reviewer based at least on the second time duration; and providing the one or more submissions from the first authorized reviewer and the second authorized reviewer regarding the particular location to be provided to one or more other client devices in a particular order based at least on the first reliability score and the second reliability score.

11. The non-transitory computer readable medium of claim 10, wherein the second time duration is longer than the first time duration.

12. The non-transitory computer readable medium of claim 11, wherein the submissions related to the particular location from the second authorized reviewer are provided before the submissions related to the particular location from the first authorized reviewer.

13. The non-transitory computer readable medium of claim 10, wherein the particular location is a real estate property that is for sale or for lease and the authorized reviewer is a real estate agent.

14. The non-transitory computer readable medium of claim 10, comprising code executable by the processor to perform the method, the method further comprising compiling a list of authorized reviewers for the particular location, the list of authorized reviewers including the authorized reviewer.

15. The non-transitory computer readable medium of claim 14, comprising code executable by the processor to perform the method, the method further comprising providing updates regarding the particular location to the authorized reviewers for the particular location on the list of authorized reviewers.

16. The non-transitory computer readable medium of claim 14, comprising code executable by the processor to perform the method, the method further comprising providing the list to one or more parties interested in acquiring a property interest in the particular location.

17. The non-transitory computer readable medium of claim 10, wherein the predefined threshold distance is determined based on the size of the particular location.

18. The non-transitory computer readable medium of claim 10, comprising code executable by the processor to perform the method, the method further comprising receiving the one or more submissions from the first authorized reviewer when the first authorized reviewer is no longer present or is remote to the particular location.

19. A system comprising:
a processor; and
a memory storing instructions that, when executed by the processor, cause the processor to:
receive a representation of a first perspective reviewer, from a first client device, the representation of the first perspective reviewer indicating a first reviewer's presence at a particular location, the first client device being associated with the first perspective reviewer and the first perspective reviewer being one who intends to submit one or more submissions relating to the particular location;
receive location coordinates of a location-enabled device from the first perspective reviewer, the location-enabled device being proximate to the first perspective reviewer when providing the location coordinates;
track a first time duration when the first perspective reviewer is present at the particular location by monitoring a time period the location-enabled device is present, using the location coordinates, within a predefined threshold distance to the particular location;
deem the first perspective reviewer as a first authorized reviewer of the particular location if the first time duration equals or exceeds a threshold of time, the threshold of time being based on a size of the particular location;
assign a first reliability score to submissions related to the particular location from the first authorized reviewer based at least on the first time duration;
receive a representation of a second perspective reviewer, from a second client device, the representation of the second perspective reviewer indicating a second reviewer's presence at the particular location, the second client device being associated with the second perspective reviewer and the second perspective reviewer being one who intends to submit the one or more submissions relating to the particular location;
track a second time duration when the second perspective reviewer is present at the particular location by monitoring the time period the location-enabled device is present, using the location coordinates, within the predefined threshold distance to the particular location;
deem the second perspective reviewer as a second authorized reviewer of the particular location if the second time duration equals or exceeds the threshold of time;
assign a second reliability score to submissions related to the particular location from the second authorized reviewer based at least on the second time duration; and
provide the one or more submissions from the first authorized reviewer and the second authorized reviewer regarding the particular location to be provided to one or more other client devices in a particular order based at least on the first reliability score and the second reliability score.

20. The system of claim 19, wherein the predefined threshold distance is determined based on the size of the particular location.

* * * * *